June 16, 1964 W. F. COENEN 3,137,491
OPERATING MECHANISM FOR A SLIDING ROOF FOR CARRIAGE BODIES
Filed Nov. 28, 1961 2 Sheets-Sheet 1
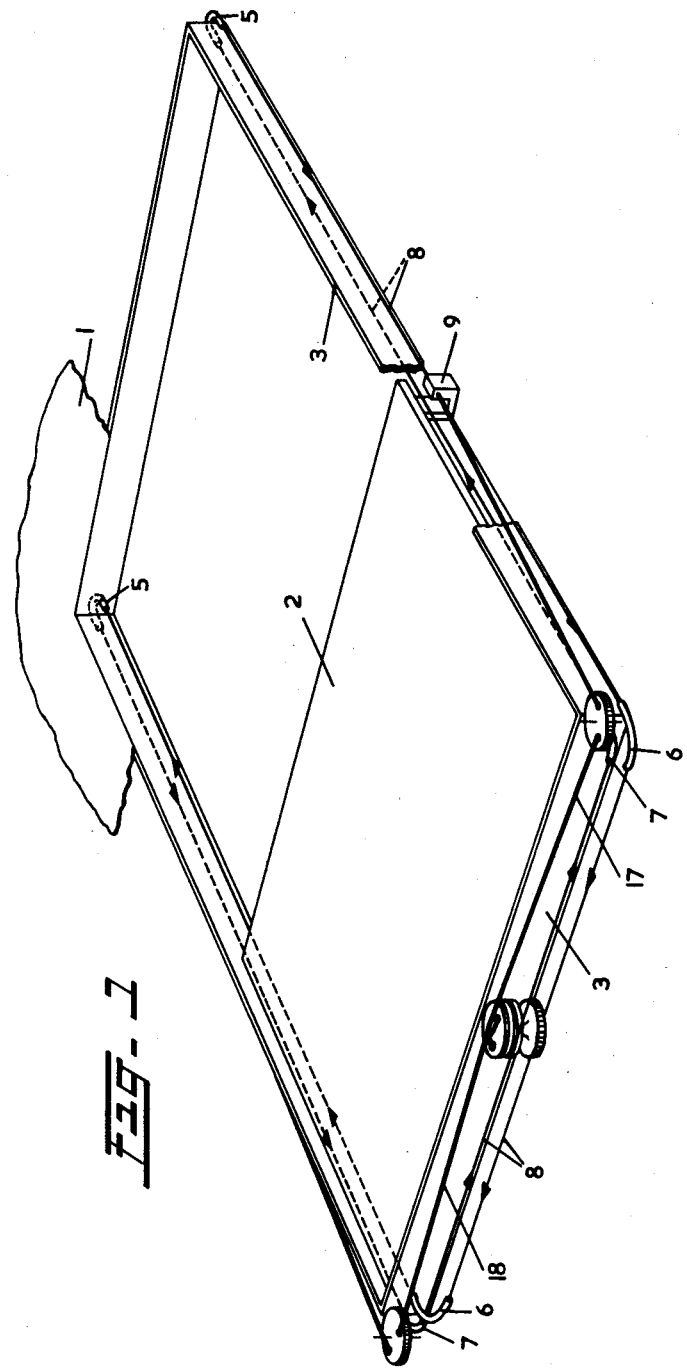

June 16, 1964  W. F. COENEN  3,137,491
OPERATING MECHANISM FOR A SLIDING ROOF FOR CARRIAGE BODIES
Filed Nov. 28, 1961  2 Sheets-Sheet 2
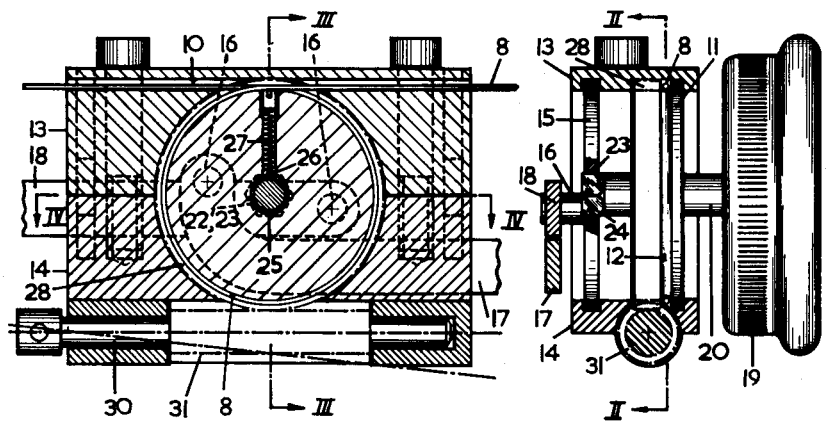
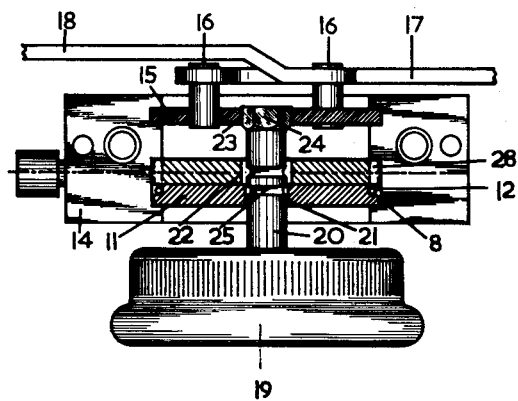
INVENTOR.
BY even# United States Patent Office 3,137,491
Patented June 16, 1964

3,137,491
OPERATING MECHANISM FOR A SLIDING
ROOF FOR CARRIAGE BODIES
Willem Frans Coenen, Prinses Marielaan 26,
Wassenaar, Netherlands
Filed Nov. 28, 1961, Ser. No. 155,326
4 Claims. (Cl. 268—46)

The invention relates to an operating mechanism for a sliding roof for carriage bodies, having a displacement device operating with an endless cable, chain or the like, provided with a common member acting on either the closure or the cable.

Such an operating mechanism is known. With this mechanism the roof panel is only directly locked in the entirely closed position, but in the other, partly or entirely opened, positions, the roof panel must be fixed by locking the cable. The inertia forces exerted by the roof panel on sudden braking and the like of the relative vehicle, must be taken by the cable. This involves premature elongation and eventually breakage of the cable.

The invention has for its object to avoid this drawback. To that end the operating mechanism according to the invention is so constructed that the common member consists of an axle which is axially movable between at least two positions and has a handwheel or knob, on rotation of which in one position a disc with pins for the espagnolette rods, which is coaxial with the axle, and in the other position a, likewise coaxial, cable-drum, is unrotatably connected to the handwheel.

By virtue of this it is achieved that the cable is exclusively used for displacing the roof panel, and the espagnolette mechanism is used for locking and fixing the roof panel in any desired position. The espagnolette rod system is particularly suitable for use with the roof panel as described in Dutch Patent 65,895.

The invention will now be further elucidated with reference to the drawing.

FIGURE 1 is a perspective, partly diagrammatic, view of a sliding roof with an operating member according to the invention;

FIGURE 2 is a vertical longitudinal section along the line II—II in FIGURE 3;

FIGURE 3 is a vertical cross-section along the line III—III in FIGURE 2; and

FIGURE 4 is a horizontal section of the operating mechanism, taken on the line IV—IV in FIGURE 2.

In FIGURE 1, the numeral 1 designates a portion of the stationary body roof and 2 designates the sliding roof. The guide frame 3 for the sliding roof is secured to the lower side of the body roof and comprises guide members 5, 6, 7 for the endless cable 8, connected to the sliding roof by means of a clamp 9 secured to either side of the sliding roof.

The cable enters the housing of the operating mechanism proper by way of bores 10 and is wound one turn about a cable drum 11 with cable groove 12. The housing is divided into two parts 13, 14, in such a manner that on separation the cable drum and disc 15, which is provided with pins 16 for hinging the espagnolette rods 17, 18 thereto together with axle 20, mounted for axial sliding movement in cable drum 11 and provided with a handwheel 19, can be removed from or inserted into the housing.

The bore 21 in the cable drum terminates at the side facing disc 15 in a hexalateral 22, while the bore 23 in disc 15 is likewise hexalaterally constructed, i.e. according to a regular six-sided prism. Further, axle 20 is provided with a six-sided end 24. By being axially moved into, respectively the one and the other final position, the axle can be connected to respectively the disc 15 and the cable drum 11, so that these members can be actuated separately by turning the the handwheel 19.

For the purpose of determining a neutral, inactive position between the two final positions, axle 20 is provided with a peripheral groove 25; when the neutral position is reached, a ball 26, which is loaded by a spring 27, snaps into the groove. If so desired, such a groove may be provided for any of the positions of the axle.

Within the scope of the invention numerous further changes in minor points are possible.

I claim:

1. Operating mechanism for a sliding roof for carriage bodies having a displacement device comprising a cable drum operating with an endless cable, chain or the like, and a closure comprising espagnolette rods and a disc carrying pins connected to said rods, said mechanism further comprising a common member acting selectively on the closure disc and the cable drum, said common member consisting of a rotatable axle which is axially movable between at least two positions and is provided with a handwheel, said axle, in one of said positions being in rotary driving engagement with said disc with pins for the espagnolette rods, which is coaxial with the axle, and in another of said positions, said axle being in rotary driving engagement with said cable-drum, said drum being coaxial with said axle and said disc.

2. Operating mechanism according to claim 1, further comprising a spring-urged member for axially fixing said axle in any position.

3. Operating mechanism according to claim 1, wherein the axle is movable into a neutral disengaged position between the two operating positions.

4. Operating mechanism according to claim 2, wherein the axle is movable into a neutral disengaged position between the two operating positions.

References Cited in the file of this patent

UNITED STATES PATENTS

| 2,727,406 | Opocensky | Dec. 20, 1955 |
| 2,774,624 | Lower | Dec. 18, 1956 |
| 2,775,143 | Herlach | Dec. 25, 1956 |

FOREIGN PATENTS

| 323,380 | Great Britain | Jan. 2, 1930 |
| 568,755 | Great Britain | Apr. 15, 1945 |